Dec. 1, 1970   W. V. COLLINS   3,544,132
TRAILER STABILIZER
Filed Jan. 21, 1969

INVENTOR.
WILLIAM V. COLLINS
BY
Woodard, Weikart, Emhardt & Naughton
ATTORNEYS

United States Patent Office 3,544,132
Patented Dec. 1, 1970

3,544,132
TRAILER STABILIZER
William V. Collins, 1411 S. Hackley,
Muncie, Ind. 47302
Filed Jan. 21, 1969, Ser. No. 792,273
Int. Cl. B62d 53/00
U.S. Cl. 280—446      7 Claims

ABSTRACT OF THE DISCLOSURE

A trailer stabilizer having a central bar attached to the forward section of a trailer, pivotally attached to either end of said central bar are dog leg shaped pressure arms wherein opposing ends of the dog leg shaped pressure arms are attached to each other by means of a push-pull rod. The other ends of the dog leg shaped pressure arms are attached via flexible cables and springs to the towing vehicle chassis in the vicinity of the trailer hitch.

BACKGROUND OF THE INVENTION

Field of the invention

This invention is concerned with a trailer stabilizer which is preferably used in conjunction with trailers which are pulled via an automobile. The trailer stabilizer of this invention minimizes the tendency of the trailer to fishtail and sway when in motion.

Description of the prior art

Stabilizers are commonly used in conjunction with trailers which are pulled via automobiles. The vast majority of the prior art stabilizers are located on the forward extremity of the trailer frame and, as such, are capable of only exerting a stabilizing force on the forward section of the trailer. This is somewhat of a disadvantage in that in order to make maximum utilization of the stabilizing force, this force must be transmitted to the rearward extremities of the trailer in question. Examples of prior art devices which are capable of exerting force only on the forward extremity of the trailer are illustrated in U.S. Pat. Nos. 3,305,246 to Gonczy et al., 3,380,757 to Sprout et al. and 3,379,456 to Bogie.

From a mechanical point of view, it is most desirable that a trailer stabilizer device be located on the forward extremity of the trailer in question. However, as was discussed above, from a stabilizing point of view, it is desirable that the stabilizer be capable of transmitting a force to the rearward extremity of the trailer in question. In some prior art the trailer stabilizer is located in the rearward extremity of the trailer. However, because all stabilizing forces must originate with the towing vehicle, in this instance a stabilizing force must be transmitted from the towing vehicle to the rearward extremity of the trailer via complex linkage. An example of such a prior art device is illustrated in U.S. Pat. No. 3,394,949 Gearhart. In the device of this patent it should be noted that a stabilizing force is transferred from the towing vehicle to the stabilizer via a complex cable arrangement.

SUMMARY OF THE INVENTION

This invention is concerned with a trailer stabilizing device which is attached to the forward section of a trailer. The trailer stabilizing device comprises a central bar to which is attached a pair of dog leg shaped pressure arms. By the movement of these dog leg shaped pressure arms, force is transmitted from the central bar via a pair of pressure rods to the rearward extremities of the trailer in such a fashion as to stabilize said trailer when it begins to sway or fishtail.

DESCRIPTION OF THE PREFERRED EMBODIMENT

Figures 1, 2, 3:
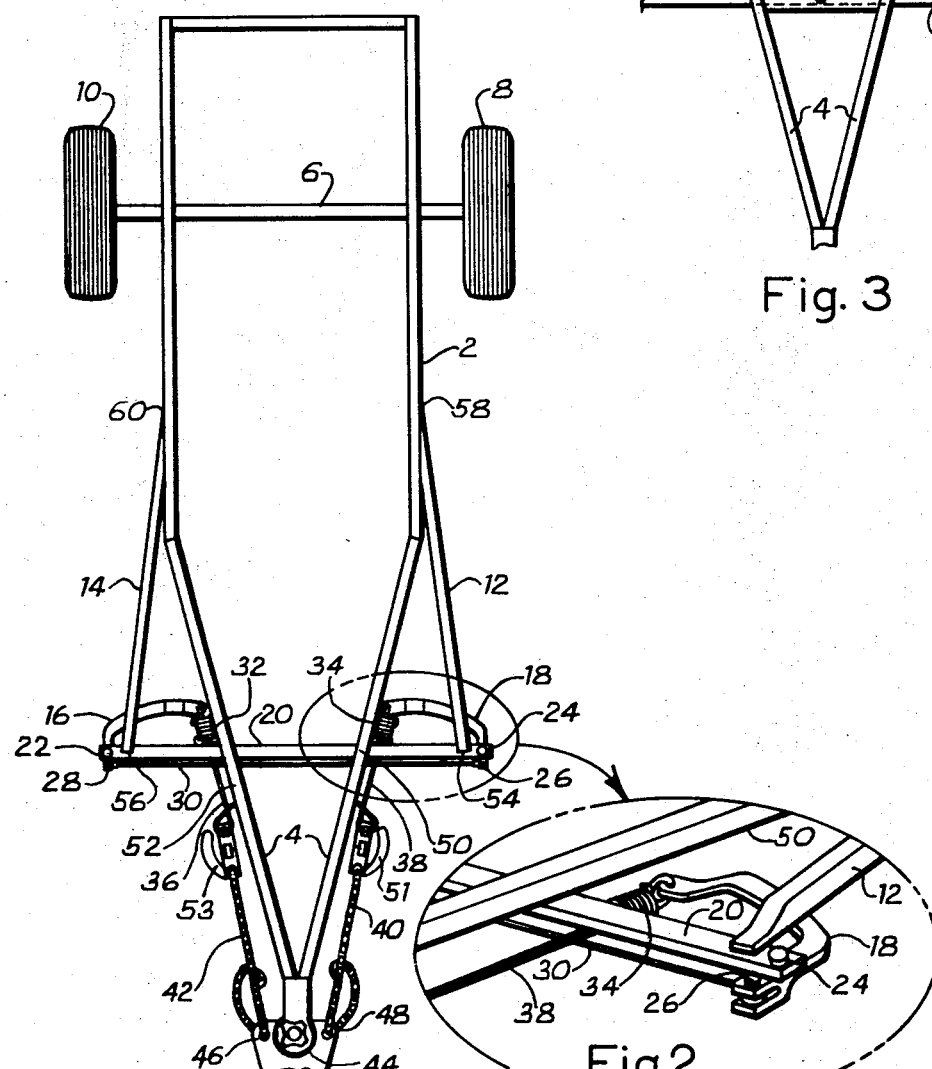
FIG. 1 is a top view showing the trailer stabilizer of this invention attached to a towing vehicle and a trailer.
FIG. 2 is a perspective view showing how the various parts of the stabilizer of this invention are attached.
FIG. 3 is a top view illustrating an alternate embodiment whereby the stabilizer of this invention is attached to the trailer frame.

Referring to FIG. 1, it can be seen that the trailer stabilizer of this invention is attached to trailer frame 2. Trailer frame 2 has a forwardly disposed A-frame section 4 which is attached to trailer frame 2. In addition, trailer frame 2 incorporates an axle 6 which is supported by a pair of opposing wheels 8 and 10.

The trailer stabilizer of this invention generally comprises a central bar 20, a pair of opposing pressure bars 12 and 14, a pair of opposing pressure arms 16 and 18, and a push-pull rod 30.

Central bar 20 is attached to A-frame 4 at points 50 and 52. This attachment is by mechanical means preferably by welding. Central bar 20 generally extends to the vicinity of the outboard sections of frame 2. Central bar 20 can be any convenient width, however, generally its length should not exceed that of axle 6.

Attached to the outward extremities of central bar 20 are a pair of opposing pressure bars 12 and 14. Pressure bars 12 and 14 are securely attached to central bar 20 at points 54 and 56, preferably by welding. Pressure bars 12 and 14 are further attached to the longitudinal section of trailer frame 2 at points 58 and 60. Finally, it can be seen that central bar 20 is secured to trailer frame 2 at points 50, 52.

In accordance with an alternate embodiment of this invention, A-frame 4 contains an additional support section 19. Central bar 20 is pivotally attached to support section 19 by a single bolt 21. For purposes of allowing pressure bars 12 and 14 to exert pressure, it can be seen that central bar 20 can pivot around bolt 21.

Central bar 20 is further provided with a pair of opposing pivot points 22 and 24. A pair of dogleg shaped pressure arms 16 and 18 are attached to central bar 20 via pivot points 22 and 24. Because of this pivotal mounting arrangement, dogleg shaped pressure arms 16 and 18 are adapted to pivot around the ends of central bar 20.

A pair of opposing ends of dogleg shaped pressure arms 16 and 18 are further attached to the towing vehicle chassis in the vicinity of trailer hitch 44 via the cables 36 and 38. Pressure arms 16 and 18 are attached to the automobile chassis at points 46 and 48 under tension. Tension is applied to cables 36 and 38 via springs 32 and 34. Cables 36 and 38 are adapted to be attached to points 46 and 48 in the vicinity of trailer hitch 44 via short chain lengths 40 and 42. Short chain lengths 40 and 42 generally provide a means for readily adjusting the tension of springs 32 and 34 due to the fact that any convenient tension can be applied by merely moving chain lengths 40 and 42 up another link. The actual attachment of chain lengths 40 and 42 to points 46 and 48 is achieved by a pair of opposing hand boomers or chain tensioners 51 and 53.

Attached to the opposite ends of opposing pressure arms 16 and 18 is a push-pull rod 30. Push-pull rod 30 is pivotally attached to pressure arms 16 and 18 at points 26 and 28. The movement of pressure arms 16 and 18 around pivot points 22 and 24 is generally synchronized by push-pull rod 30. That is, any movement in pressure arm 16 will be immediately reflected in an opposite movement in pressure arm 18. This opposing force being transmitted by push-pull rod 30.

Referring to the overall FIG. 1, it can be seen that trailer 2 is adapted to pivot in either a clockwise or counter clockwise direction around trailer hitch 44. Because of this pivotal arrangement, trailer frame 2 can fishtail or sway around trailer hitch 44 when instability due to road conditions or driving conditions are introduced into trailer frame 2 via wheels 8 and 10.

By way of illustration, it can be seen that when trailer frame 2 tends to pivot in a counter-clockwise direction around trailer hitch 44, spring 34 is immediately put under additional tension. This additional tension created by spring 34 causes pressure arm 18 to pivot around point 24 in a counter-clockwise direction. This counter-clockwise rotation of pressure arm 18 causes push-pull rod 30 to move in a rightward direction because push-pull rod 30 is pivotally attached to pressure arms 16 and 18 at points 26 and 28. Pressure arm 16 is caused to rotate in a counterclockwise direction around pivot point 22. This pivotal rotation of pressure arm 16 causes pressure to be exerted to central bar 20 which is in turn transmitted to pressure bar 14 which exerts a clockwise force to trailer frame 2 via point 60. If trailer frame 2 tends to pivot in a clockwise direction, an opposite effect of that described above is achieved. In summary, it can be seen that when trailer frame 2 tends to pivot in either direction, an immediate and opposing force is so applied whereby the tendency of trailer frame 2 to sway or fishtail is minimized.

In accordance with the illustrated embodiment of this invention, the stabilizing force as is created by the stabilizer of this invention is transmited to frame 2 at points 58 and 60. However, this stabilizing force can be further transmitted to any point on frame 2 by additional bracing. For example if a stabilizing force is desire behind wheels 8 and 10, additional cables, coil springs and turnbuckles can be provided from points 58 and 60 to the extremities of frame 2 which are located behind wheels 8 and 10.

Cables 36 and 38 are attached to the chassis at points 46 and 48. Points 46 and 48 can be any convenient distance desired from trailer hitch 44. The distance of points 46 and 48 from trailer hitch 44 is regulated by many variables such as the chassis strength, the length of the trailer, the location of the wheels, etc. Under most circumstances, points 46 and 48 are approximately 6 inches from trailer hitch 44.

What is claimed is:

1. A trailer stabilizing device for a hitch assembly having a pivotal hitch connecting a towing vehicle and a trailer vehicle for relative swinging about an upright axis disposed between the vehicles, said stabilizing device comprising: a central bar extending transversely across and beyond the opposite sides of the trailer frame, a pair of opposing dog leg shaped pressure arms each pivotally attached intermediate its ends to the extremities of said central bar, a pair of connector means each attached to the towing vehicle chassis on opposite sides of said axis and to respective opposing ends of said arms, and a push-pull rod pivotally connecting the other opposing pair of ends of said pressure arms, and a pair of longitudinally extending pressure bars each respectively connected at one end thereof to an opposing end of said central bar and in turn rearwardly disposed along the opposite sides of said trailer frame and attached thereto at their opposite ends.

2. The trailer stabilizing device of claim 1 wherein the forward portion of the trailer has an A-frame portion and said central bar is securely attached thereto.

3. The trailer stabilizing device of claim 1 wherein the forward portion of the trailer has an A-frame portion and said central bar is pivotally attached thereto.

4. The trailer stabilizing device of claim 1 wherein said pressure arms are attached to said towing vehicle chassis by a pair of opposing flexible cables.

5. The stabilizing device of claim 2 wherein said connecting cables are further attached to a pair of opposing coil springs which are adapted to keep the opposing pressure arms under tension.

6. The trailer stabilizing device of claim 3 wherein said pressure arms are attached to said towing vehicle chassis by a pair of opposing flexible cables.

7. The trailer stabilizing device of claim 1 wherein additional bracing is provided from a point where opposing pressure rods contact the trailer frame in such a fashion that the stabilizing force is further transmitted to the rearward section of the trailer frame.

References Cited

UNITED STATES PATENTS

| | | | |
|---|---|---|---|
| 2,612,382 | 9/1952 | Landis | 280—456 |
| 3,379,456 | 4/1968 | Bogie | 280—446 |
| 3,380,757 | 4/1968 | Sprout | 280—446 |
| 3,394,949 | 7/1968 | Gearhart | 280—446 |

LEO FRIAGLIA, Primary Examiner